(12) United States Patent
Sun et al.

(10) Patent No.: US 10,323,110 B2
(45) Date of Patent: Jun. 18, 2019

(54) ETHYLENE/ALPHA-OLEFIN COPOLYMER HAVING EXCELLENT PROCESSABILITY

(71) Applicant: LG CHEM, LTD., Seoul (KR)

(72) Inventors: Soon Ho Sun, Daejeon (KR); Yi Young Choi, Daejeon (KR); Ki Soo Lee, Daejeon (KR); Eun Kyoung Song, Daejeon (KR); Yu Taek Sung, Daejeon (KR); Ye Jin Lee, Daejeon (KR); Chang Woan Han, Daejeon (KR); Sol Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/501,415

(22) PCT Filed: Apr. 15, 2016

(86) PCT No.: PCT/KR2016/003947
§ 371 (c)(1),
(2) Date: Feb. 2, 2017

(87) PCT Pub. No.: WO2016/167601
PCT Pub. Date: Oct. 20, 2016

(65) Prior Publication Data
US 2017/0233511 A1    Aug. 17, 2017

(30) Foreign Application Priority Data
Apr. 15, 2015    (KR) ........................ 10-2015-0053279

(51) Int. Cl.
| C08F 210/08 | (2006.01) |
| C08F 210/16 | (2006.01) |
| C08F 4/6592 | (2006.01) |
| C08L 23/08 | (2006.01) |
| C08F 4/659 | (2006.01) |

(52) U.S. Cl.
CPC ............ C08F 210/16 (2013.01); C08L 23/08 (2013.01); *C08F 4/6592* (2013.01); *C08F 4/65908* (2013.01); *C08F 4/65912* (2013.01); *C08F 4/65916* (2013.01); *C08F 4/65925* (2013.01); *C08F 4/65927* (2013.01)

(58) Field of Classification Search
CPC . C08F 210/16; C08F 4/65927; C08L 23/8016
See application file for complete search history.

(56) References Cited

U.S. PATENT DOCUMENTS

| 4,935,474 | A | 6/1990 | Ewen et al. |
| 5,914,289 | A | 6/1999 | Razavi |
| 6,828,394 | B2 | 12/2004 | Vaughan et al. |
| 6,841,631 | B2 | 1/2005 | Loveday et al. |
| 6,894,128 | B2 | 5/2005 | Loveday et al. |
| 2011/0217499 | A1 | 9/2011 | Mannebach et al. |
| 2012/0010375 | A1 | 1/2012 | Yang et al. |
| 2012/0015123 | A1 | 1/2012 | Kwon et al. |
| 2012/0123078 | A1 | 5/2012 | Lee et al. |
| 2013/0085244 | A1* | 4/2013 | Zhao ..................... C08F 110/02 526/126 |
| 2014/0100343 | A1* | 4/2014 | Ker ....................... C08F 210/16 526/147 |
| 2014/0213734 | A1 | 7/2014 | Jiang |
| 2016/0237187 | A1 | 8/2016 | Hong et al. |
| 2016/0333124 | A1 | 11/2016 | Sung et al. |

FOREIGN PATENT DOCUMENTS

| CN | 103339187 A | 10/2013 |
| EP | 2428525 A2 | 3/2012 |
| EP | 2460809 A2 | 6/2012 |
| EP | 3078682 A1 | 10/2016 |
| EP | 3168243 A1 | 5/2017 |
| KR | 10-2004-0076965 A | 9/2004 |
| KR | 10-2011-0013286 A | 2/2011 |
| KR | 10-2012-0007718 A | 1/2012 |
| KR | 10-2013-0113322 A | 10/2013 |
| KR | 10-2015-0015789 A | 2/2015 |
| KR | 10-2015-0037520 A | 4/2015 |
| WO | 2004/076502 A1 | 9/2004 |
| WO | 2012/112259 A2 | 8/2012 |
| WO | 2013/037432 A1 | 3/2013 |

OTHER PUBLICATIONS

Florian J. Stadler et al., "Thermorheological Behavior of Various Long-Chain Branched Polyethylenes" Macromolecules, 2008, 41 (4), pp. 1328-1333,
Pan, et al.: "Investigation of the effect of branched structure on the performances of the copolymers synthesized from ethylene and alfa-olefin with rac-Et(Ind)2ZrCl2/MMAO catalyst system", XP028060264, Polymer, Elsevier Science Publishers, vol. 47, No. 4, Feb. 8, 2006, pp. 1465-1472.

* cited by examiner

*Primary Examiner* — Caixia Lu
(74) *Attorney, Agent, or Firm* — Dentons US LLP

(57) ABSTRACT

The present invention relates to an ethylene/alpha-olefin copolymer having excellent processability. The ethylene/alpha-olefin copolymer according to the present invention has excellent processability and is therefore suitable for producing products by an injection molding method.

7 Claims, 2 Drawing Sheets

ETHYLENE/ALPHA-OLEFIN COPOLYMER HAVING EXCELLENT PROCESSABILITY

CROSS-REFERENCE TO RELATED APPLICATION(S)

This application is a National Stage Application of International Application No. PCT/KR2016/003947 filed on Apr. 15, 2016, which claims the benefit of Korean Patent Application No. 10-2015-0053279 filed on Apr. 15, 2015, all of which are hereby incorporated by reference in their entirety for all purposes as if fully set forth herein.

TECHNICAL FIELD

The present invention relates to an ethylene/alpha-olefin copolymer having excellent processability.

BACKGROUND OF ART

Olefin polymerization catalyst systems can be classified into Ziegler-Natta and metallocene catalyst systems, and these two highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that molecular weight distribution of polymers is broad. Also, since compositional distribution of comonomers is not uniform, there is a problem that it has a limitation to secure the desired physical properties.

Meanwhile, the metallocence catalyst comprises a combination of a main catalyst whose main component is a transition metal compound, and an organometallic compound cocatalyst whose main component is aluminium. Such a catalyst is a single-site catalyst which is a homogeneous complex catalyst, and offers a polymer having a narrow molecular weight distribution and an uniform composition distribution of comonomers, depending on the single site characteristics. The metallocence catalyst has characteristics which can control the stereoregularity, copolymerizing properties, molecular weight, crystallinity and the like of the resulting polymer by changing the ligand structure of the catalyst and the polymerization condition.

U.S. Pat. No. 5,914,289 discloses a method of controlling the molecular weight and the molecular weight distribution of polymers using metallocene catalysts which are respectively supported on supports. However, a large amount of solvent and a long period of time are required to prepare the supported catalysts, and the process of supporting metallocene catalysts on the respective supports is troublesome.

Korean Patent Application No. 10-2003-12308 discloses a method of controlling the molecular weight distribution of polymers by supporting a bi-nuclear metallocene catalyst and a mononuclear metallocene catalyst on a support with an activator, thus changing a combination of catalysts in a reactor and performing polymerization. However, this method has a limitation to achieve the properties of the respective catalysts simultaneously. In addition, there is a disadvantage that a metallocene catalyst portion is departed from a supported component of the catalyst to cause fouling in the reactor.

Therefore, in order to solve the above-mentioned disadvantages, there is a need to develop a method for preparing olefinic polymers with the desired physical properties by easily preparing a supported hybrid metallocene catalyst having an excellent activity.

On the other hand, a linear low density polyethylene is produced by copolymerizing ethylene and alpha olefin using a polymerization catalyst under low pressure. Thus, this is a resin having a narrow molecular weight distribution and a certain length of a short chain branch, without a long chain branch. The linear low density polyethylene film has high strength and elongation at break in addition to the properties of a general polyethylene and exhibits excellent tear strength, falling weight impact strength or the like. This has led to an increase in the use of a stretch film, an overlapping films or the like which is difficult to apply existing low density polyethylene or high density polyethylene.

However, the linear low density polyethylene using 1-butene or 1-hexene as a comonomer is mostly prepared in a single gas phase reactor or a single loop slurry reactor, and has a high productivity compared to a process using 1-octene comonomer. However, these products have limitations in the catalyst technology and process technology. Thus, they are problematic in that their physical properties are greatly inferior to when using 1-octene comonomer, and the molecular weight distribution is narrow, resulting in poor processability. Many studies have been conducted to improve these problems.

U.S. Pat. No. 4,935,474, describes a process for preparing polyethylene having a broad molecular weight distribution by using two or more metallocene compounds. U.S. Pat. No. 6,828,394 discloses a process for producing polyethylene which is excellent in processability and particularly suitable for a film, by using a catalyst system comprising a poor comonomer incorporating catalyst compound and a good comonomer incorporating catalyst compound. In addition, U.S. Pat. Nos. 6,841,631 and 6,894,128 describe that polyethylene having a bimodal or multimodal molecular weight distribution is produced by using a metallocene-type catalyst including at least two metal compounds, and thus it can be used in various applications such as film, blowing and molding, and pipe. However, although these products have improved processability, there is still a problem that the dispersed state per molecular weight within unit particles is not uniform, and thus the extruded appearance is rough even under relatively good extrusion condition and the physical properties are not stable.

Given the above circumstances, there is a constant demand for the production of superior products having a balance between physical properties and processability. In particular, the necessity of a polyethylene copolymer having excellent processability is further required.

DETAILED DESCRIPTION OF THE INVENTION

Technical Problem

In order to solve the problems of the prior arts, it is an object of the present invention to provide an ethylene/alpha-olefin copolymer having excellent processability.

Technical Solution

In order to achieve these objects, the present invention provides an ethylene/alpha-olefin copolymer which satisfies the following conditions:
a molecular weight of 50,000 to 150,000 g/mol,
a molecular weight distribution (Mw/Mn) of 2 to 10, a density of 0.940 to 0.965 g/cm³, a melt flow rate ratio ($MFR_5/MFR_{2.16}$, measured at 190° C. according to ASTM 1238) of 3.5 or more, a $C_2$ value of −0.25 or less when a graph of a complex viscosity (η*[Pa·s] versus a frequency (ω[rad/s] is fitted to a Power Law of Equation 1 below, $$y=c_1 x^{c_2}.$$ [Equation 1]

For a perfectly elastic material, a deformation (strain) occurs in proportion to an elastic shear stress, which is called a Hook's law. In addition, for a pure viscose liquid, a deformation occurs in proportion to a viscous shear stress, which is called a Newton's law. For a completely elastic material, a deformation can be again restored when the elastic energy is accumulated and the elastic shear stress is removed. However, for a completely viscous material, the energy is completely discarded by deformation and thus the deformation is not restored even when the elastic shear stress is removed. In addition, the viscosity of the material itself does not change.

However, in a molten state, a polymer has an intermediate property between a completely elastic material and a viscous liquid, which is called a viscoelasticity. In other words, when a polymer is subjected to a shear stress in the molten state, the deformation is not proportional to the shear stress, and its viscosity varies depending on the shear stress, which is also called a non-Newtonian fluid. These properties are due to the complexity of deformation due to the shear stress because the polymer has a huge molecular size and a complex intermolecular structure.

In particular, when producing a molded article by using a polymer, a shear-thinning phenomenon is considered as one of the important characteristics of the non-Newtonian fluid. The shear-thinning phenomenon means a phenomenon in which the viscosity of a polymer decreases as the shear rate increases. The method of molding a polymer is determined according to these shear-thinning properties. In particular, when producing a molded article requiring high-speed polymer extrusion as in the present invention, a considerable pressure must be applied to the molten polymer, and so it is difficult to manufacture such a molded article unless the shear-thinning property is exhibited. Therefore, the shear-thinning property is considered important.

In this regard, according to the present invention, the shear-thinning property is measured through a graph of a complex viscosity (η*[Pa·s]) versus a frequency (ω [rad/s]).

The Equation 1 is a model for quantitatively evaluating the shear thinning property of ethylene/alpha-olefin copolymer according to the present invention, and also is a model for estimating the complex viscosity at a high frequency by applying data of complex viscosity versus frequency.

The Equation 1 is a power law model in which x means a frequency and y means a complex viscosity, and two variables $C_1$ and $C_2$ are required. $C_1$ refers to a consistency index, $C_2$ refers to a CV index, and a $C_2$ value is a gradient of graph. The higher the complex viscosity at low frequency, the better the physical properties. Also, the lower the complex viscosity at high frequency, the better the processability. Therefore, the smaller the $C_2$ value, that is, the larger the negative gradient of graph, it is better.

In a method for fitting a graph of a complex viscosity versus a frequency to the Equation 1 above, TA Orchestrator which is a ARES measurement program of TA Instruments can be used.

The ethylene/alpha-olefin copolymer has preferably a molecular weight of 80,000 to 90,000 g/mol.

Also, the ethylene/alpha-olefin copolymer has preferably a molecular weight distribution of 5 to 6.

Further, the ethylene/alpha-olefin copolymer has preferably a density of 0.960 to 0.965 g/cm³.

Further, the ethylene/alpha-olefin copolymer has preferably a melt flow rate ratio of 3.5 to 40.

Further, the ethylene/alpha-olefin copolymer has preferably the $C_2$ value −0.40 to −0.25.

The alpha-olefins, which can be used for the copolymerization of ethylene/alpha-olefins, may include one or more selected from the group consisting of 1-butene, 1-pentene, 1-hexene, 4-methyl-1-pentene, 1-octene, 1-decene, 1-dodecene, 1-tetradecene, 1-hexadecene, 1-octadecene and 1-eicosene. In the ethylene/alpha-olefin copolymer, the content of the alpha-olefin can be from about 0.5 to about 10% by weight, preferably from about 1 to about 5% by weight, but is not limited thereto.

The ethylene/alpha-olefin copolymer is produced by polymerizing ethylene and alpha-olefin in the presence of one or more of the first metallocene compounds represented by the following Chemical Formula 1; and one or more of the second metallocene compounds selected from the compounds represented by the following Chemical Formulas 3 to 5:

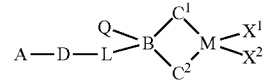

[Chemical Formula 1]

in Chemical Formula 1,

A is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{3-20}$ heterocycloalkyl, or $C_{5-20}$ heteroaryl;

D is —O—, —S—, —N(R)— or —Si(R)(R')—, wherein R and R' are same as or different from each other, and are each independently hydrogen, halogen, $C_{1-20}$ alkyl, $C_{2-20}$ alkenyl, or $C_{6-20}$ aryl;

L is a linear or branched $C_{1-10}$ alkylene;

B is carbon, silicon or germanium;

Q is hydrogen, halogen, $C_{1-20}$ alkyl, $C_{2-20}$ alkenyl, $C_{6-20}$ aryl, $C_{7-20}$ alkylaryl, or $C_{7-20}$ arylalkyl;

M is a Group 4 transition metal;

$X^1$ and $X^2$ are same as or different from each other and are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$C^1$ and $C^2$ are same as or different from each other and are each independently represented by one of the following Chemical Formulas 2a, 2b or 2c, provided that cases where both $C^1$ and $C^2$ are the Chemical Formula 2c, are excluded;

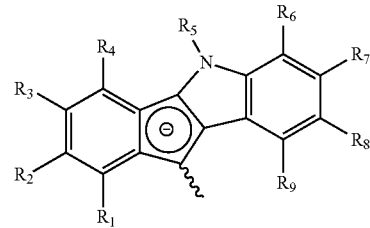

[Chemical Formula 2a]

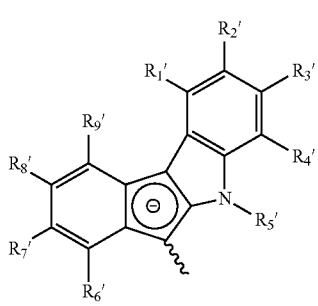

[Chemical Formula 2b]

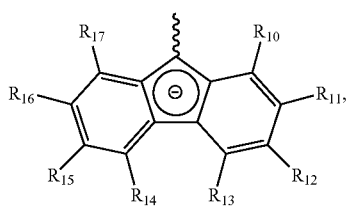

[Chemical Formula 2c]

In Chemical Formulas 2a, 2b and 2c, $R_1$ to $R_{17}$ and $R_1'$ to $R_9'$ are same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-20}$ alkylaryl, or $C_{7-20}$ arylalkyl, and adjacent two or more of the $R_{10}$ to $R_{17}$ are connected to each other to form a substituted or unsubstituted aliphatic or aromatic ring;

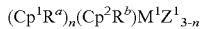 [Chemical Formula 3]

in Chemical Formula 3, $M^1$ is a Group 4 transition metal;

$Cp^1$ and $Cp^2$ are same as or different from each other and are each independently any one selected from the group consisting of cyclopentadienyl, indenyl, 4,5,6,7-tetrahydro-1-indenyl, and fluorenyl radical, which may be substituted with a hydrocarbon having 1 to 20 carbon atoms;

$R^a$ and $R^b$ are same as or different from each other and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z_1$ is a halogen atom, $C_{1-20}$ alkyl, $C_{2-20}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

n is 1 or 0;

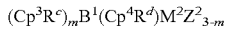 [Chemical Formula 4]

in Chemical Formula 4, $M^2$ is a Group 4 transition metal;

$Cp^3$ and $Cp^4$ are same as or different from each other and are each independently any one selected from the group consisting of cyclopentadienyl, indenyl, 4,5,6,7-tetrahydro-1-indenyl and fluorenyl radicals, which may be substituted with a hydrocarbon having 1 to 20 carbon atoms;

$R^c$ and $R^d$ are same as or different from each other and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^2$ is a halogen atom, $C_{1-20}$ alkyl, $C_{2-10}$ alkenyl, $C_{7-40}$ alkyl aryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^1$ is at least one of carbon, germanium, silicon, phosphorus, or nitrogen atom containing radicals, which cross-link $Cp^3R^c$ ring and $Cp^4R^d$ ring or which cross-link one $Cp^4R^d$ ring to $M^2$, a combination thereof;

m is 1 or 0;

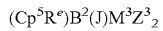 [Chemical Formula 5]

in Chemical Formula 5, $M^3$ is a Group 4 transition metal;

$Cp^5$ is any one selected from the group consisting of cyclopentadienyl, indenyl, 4,5,6,7-tetrahydro-1-indenyl and fluorenyl radicals, which may be substituted with a hydrocarbon having 1 to 20 carbon atoms;

$R^e$ is hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^3$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^2$ is at least one of carbon, germanium, silicon, phosphorus, or nitrogen atom containing radicals, which cross-link $Cp^5R^e$ ring and J, or a combination thereof;

J is any one selected from the group consisting of $NR^f$, O, $PR^f$ and S, and the $R^f$ is $C_{1-20}$ alkyl, aryl, substituted alkyl or substituted aryl.

The substituents of the Chemical Formulas 1, 3, 4 and 5 will be more specifically described as follows.

The $C_{1-20}$ alkyl includes a linear or branched alkyl and specific examples thereof include methyl, ethyl, propyl, isopropyl, n-butyl, tert-butyl, pentyl, hexyl, heptyl, octyl and the like, but are not limited thereto.

The $C_{2-20}$ alkenyl includes a linear or branched alkenyl, and specific examples thereof include allyl, ethenyl, propenyl, butenyl, pentenyl and the like, but are not limited thereto.

The $C_{6-20}$ aryl includes a monocyclic or fused ring-type aryl, and specific examples thereof include phenyl, biphenyl, naphthyl, phenanthrenyl, fluorenyl and the like, but are not limited thereto.

The $C_{5-20}$ heteroaryl includes a monocyclic or fused ring-type heteroaryl, and specific examples thereof include carbazolyl, pyridyl, quinoline, isoquinoline, thiophenyl, furanyl, imidazole, oxazolyl, thiazolyl, triazine, tetrahydro pyranyl, tetrahydrofuranyl and the like, but are not limited thereto.

Examples of the $C_{1-20}$ alkoxy include methoxy, ethoxy, phenyloxy, cyclohexyloxy and the like, but are not limited thereto.

Examples of the Group 4 transition metal include titanium, zirconium, hafnium and the like, but are not limited thereto.

More preferably, $R_1$ to $R_{17}$ and $R^{1'}$ to $R_9'$ in the Chemical Formulas 2a, 2b and 2c are each independently hydrogen, methyl, ethyl, propyl, isopropyl, n-butyl, tert-butyl, pentyl, hexyl, heptyl, octyl, phenyl, halogen, trimethylsilyl, triethylsilyl, tripropylsilyl, tributylsilyl, triisopropylsilyl, trimethylsilylmethyl, methoxy or ethoxy, but are not limited thereto.

The L in the Chemical Formula 1 is more preferably a linear or branched $C_{4-8}$ alkylene, but is not limited thereto. Also, the alkylene group may be substituted or unsubstituted with $C_{1-20}$ alkyl, $C_{2-20}$ alkenyl, or $C_{6-20}$ aryl.

In addition, A in the Chemical Formula 1 is preferably hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, or tetrahydrofuranyl, but is not limited thereto.

Further, B in the Chemical Formula 1 is preferably silicon, but it is not limited thereto.

The first metallocene compound of the Chemical Formula 1 forms a structure in which an indeno indole derivative and/or a fluorene derivative is crosslinked via a bridge, and has an unshared electron pair which can act as a Lewis base in the ligand structure, thereby exhibiting a high polymerization activity even when supported on a surface having a Lewis acid property of a support. In addition, by including an indeno indole group and/or a fluorene group which is electronically rich, the activity is high, and due to an appropriate steric hindrance and an electronic effect of the ligand, not only hydrogen reactivity is low but also the high activity is maintained even in the presence of hydrogen. Further, the beta-hydrogen of the polymer chain where the nitrogen atom of the indenoindole derivative grows is stabilized by hydrogen bonding, to inhibit beta-hydrogen elimination, thereby polymerizing an ultra-high molecular weight olefin polymer.

According to one embodiment of the present invention, a specific example of the compound represented by Chemical Formula 2a may include a compound represented by any one of the following structural formulas, but the present invention is not limited thereto.

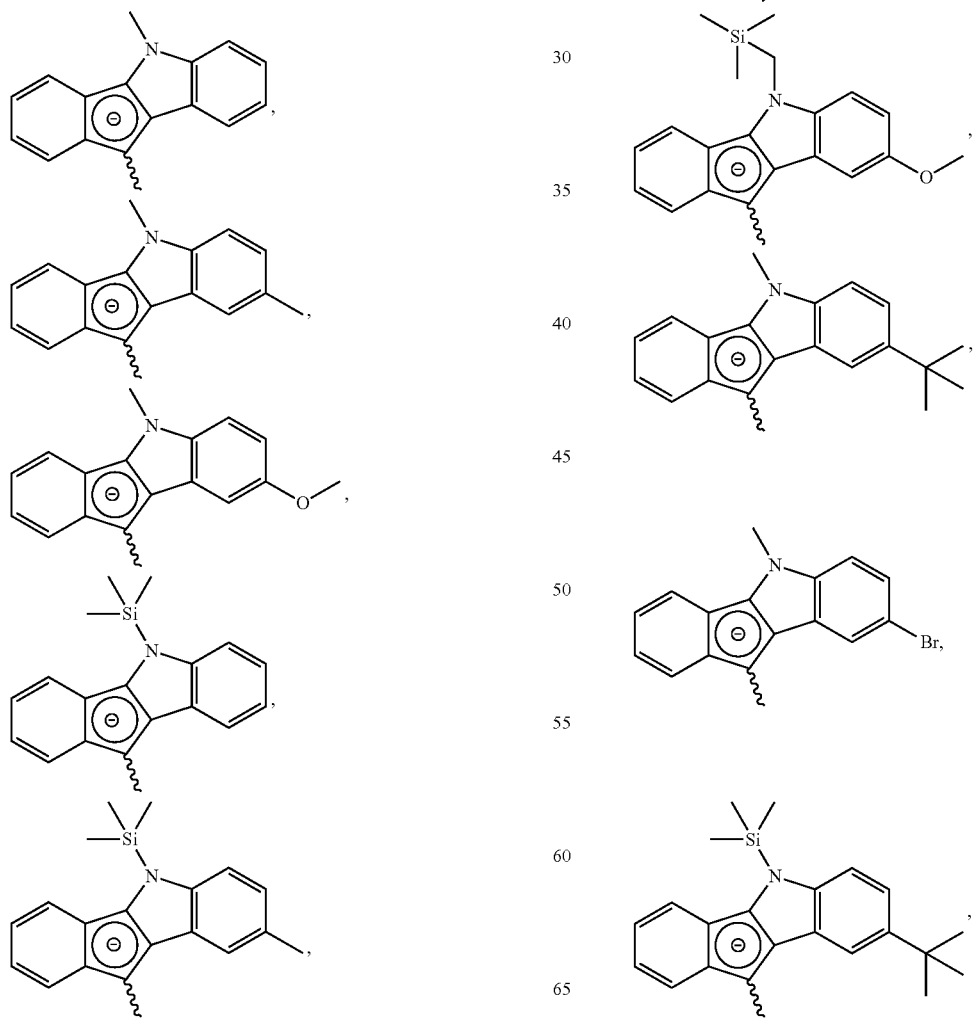

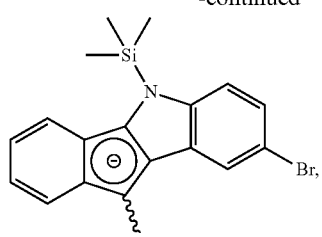
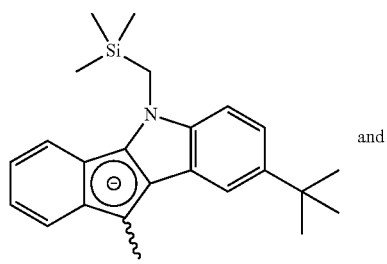
and
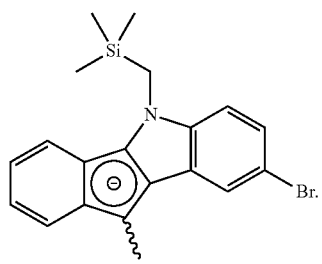
According to one embodiment of the present invention, a specific example of the compound represented by Chemical Formula 2b may include a compound represented by one of the following structural formulas, but the present invention is not limited thereto.
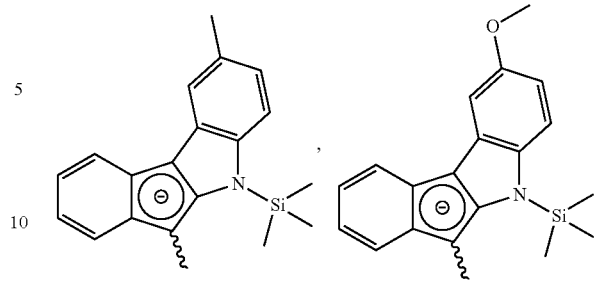
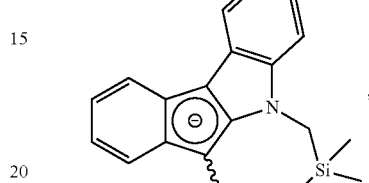
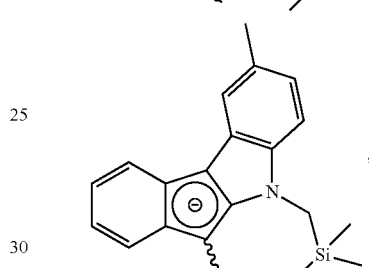
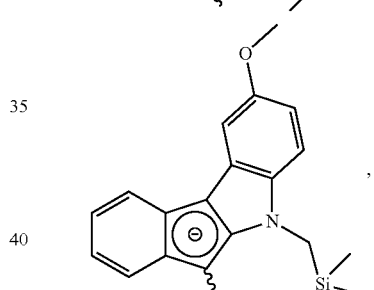
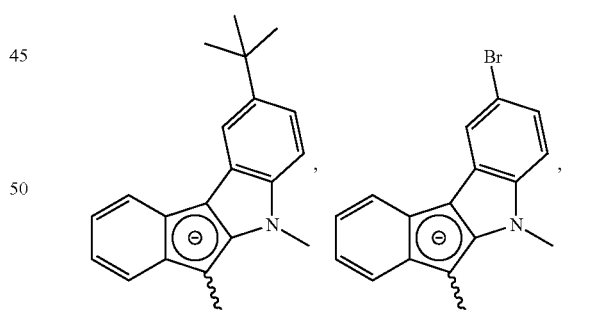
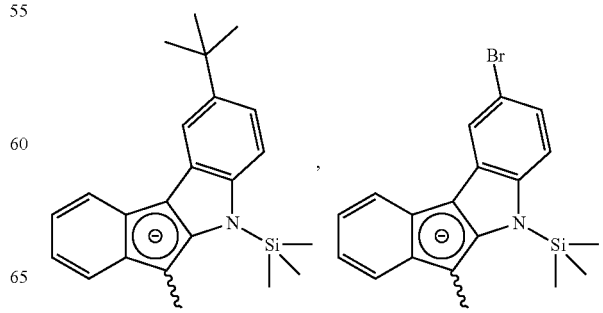

-continued

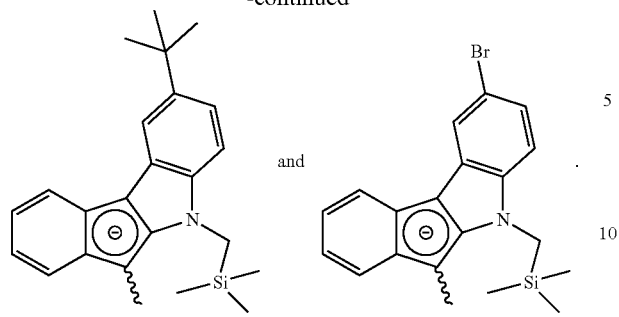

According to one embodiment of the present invention, the compound represented by Chemical Formula 2c may include a compound represented by one of the following structural formulas, but the present invention is not limited thereto.

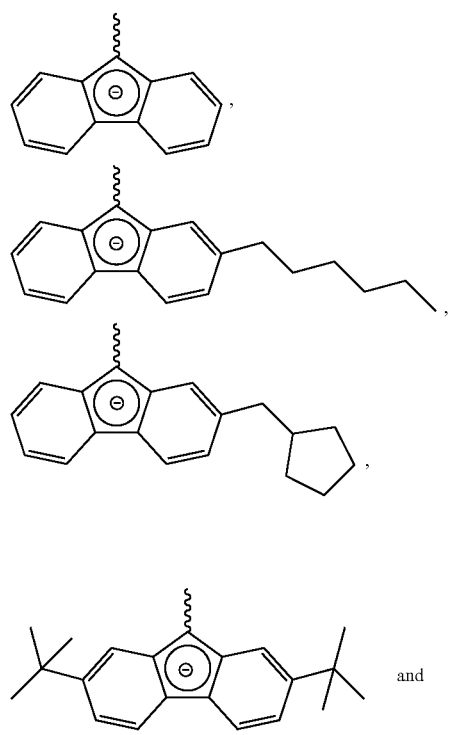

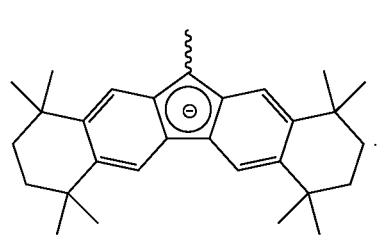

According to one embodiment of the present invention, a specific example of the first metallocene compound represented by Chemical Formula 1 may include a compound represented by one of the following structural formulas, but is not limited thereto.

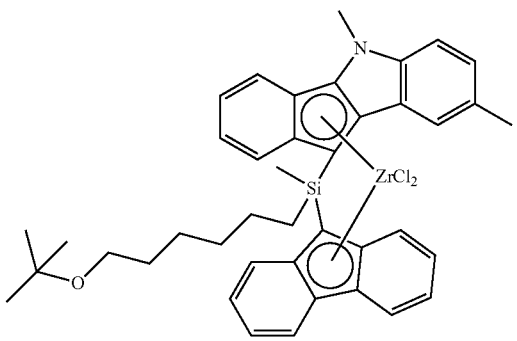

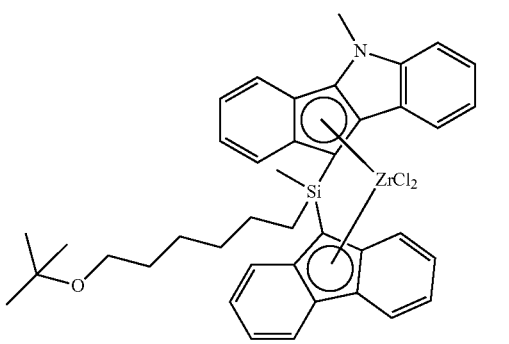

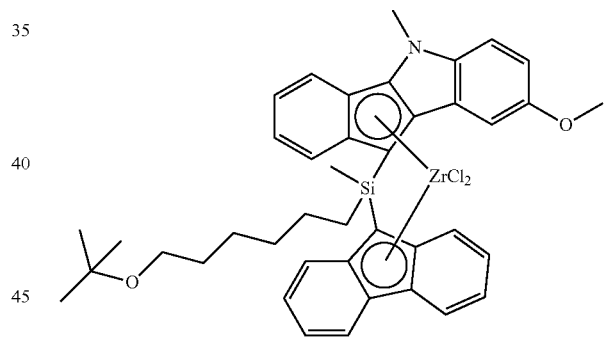

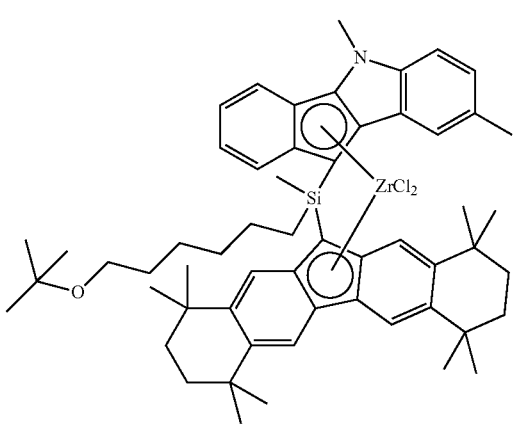

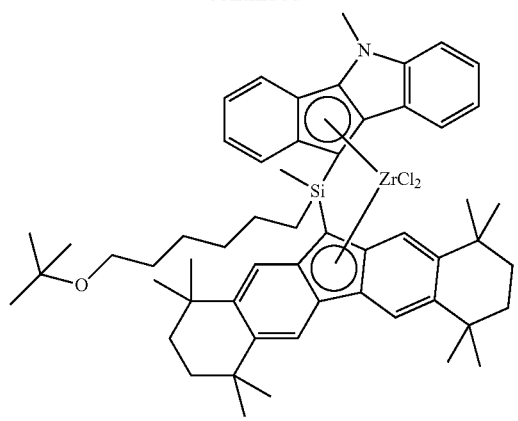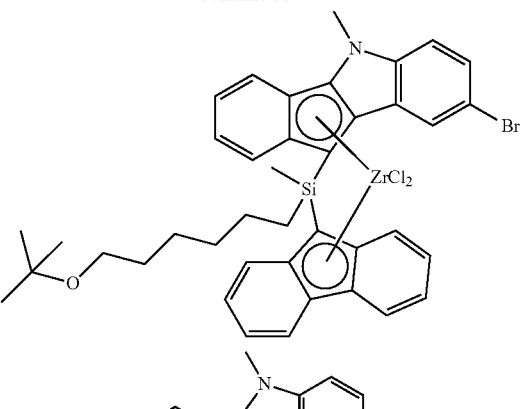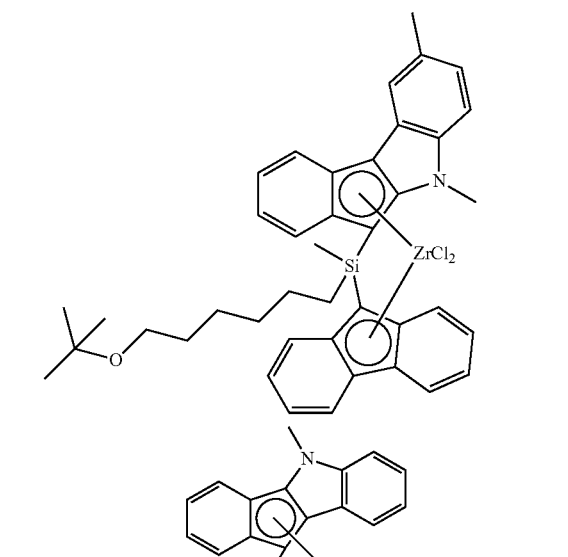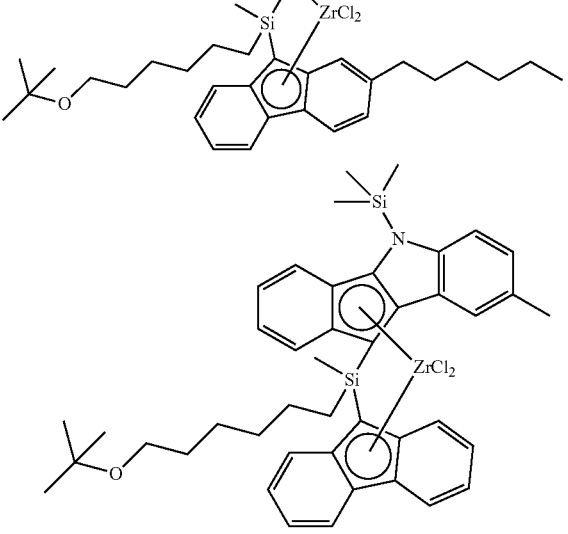

-continued

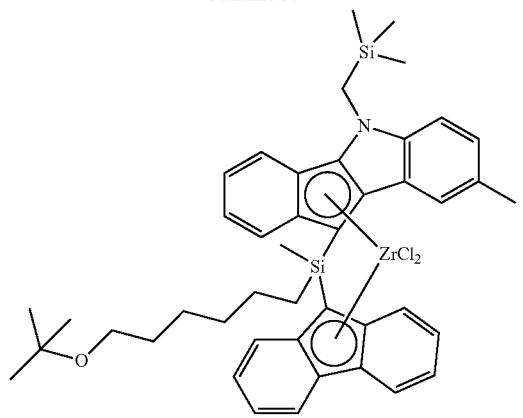

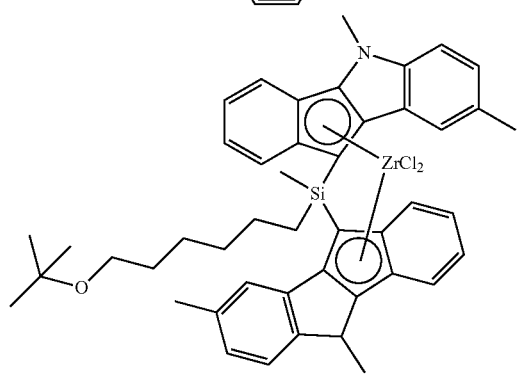

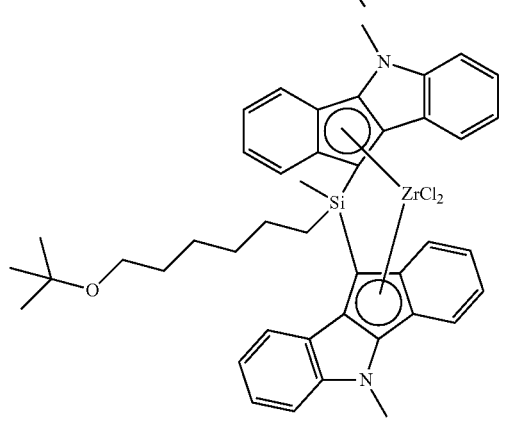

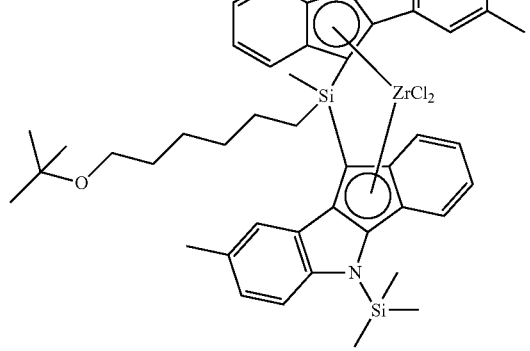

-continued

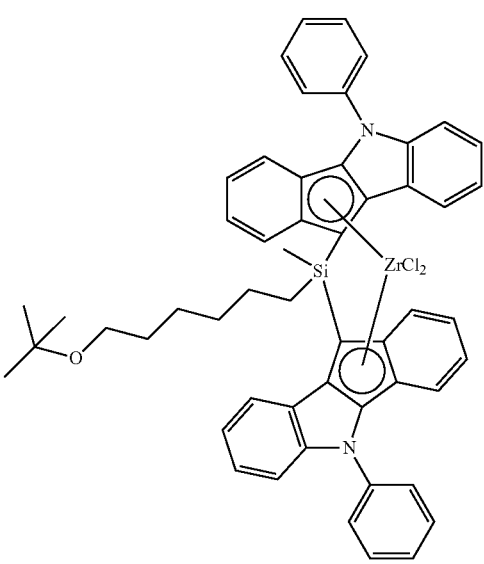

and

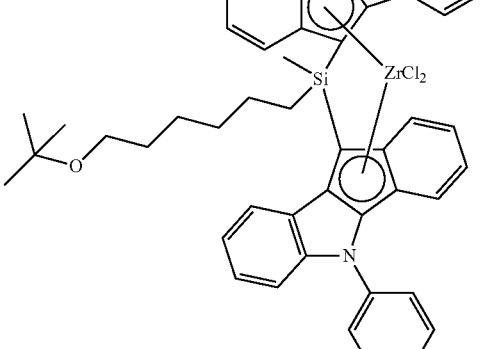

The first metallocene compound of Chemical Formula 1 has a superior activity and can polymerize an ethylene/alpha-olefin copolymer having a high molecular weight. In particular, it can exhibit a high polymerization activity even when it is used in the state of being supported on a support, and thus can produce an ethylene/alpha-olefin copolymer having a ultra-high molecular weight.

Further, even when the polymerization reaction is carried out in the presence of hydrogen in order to produce an ethylene/alpha-olefin copolymer having both a high molecular weight and a broad molecular weight distribution, the first metallocene compound of Chemical Formula 1 according to the present invention exhibits a low hydrogen reactivity and thus can still polymerize an ethylene/alpha-olefin copolymer having an ultra-high molecular weight with a high activity. Therefore, even when it is used as a hybrid with a catalyst having different characteristics, it is possible to produce an ethylene/alpha-olefin copolymer satisfying the characteristics of high molecular weight without lowering the activity, resulting in the easy preparation of an ethylene/alpha-olefin copolymer having broad molecular weight distribution while containing the ethylene/alpha-olefin copolymer having high molecular weight.

The first metallocene compound of Chemical Formula 1 can be prepared by connecting an indenoindole derivative and/or a fluorene derivative via a bridging compound to prepare a ligand compound, then introducing a metal precursor compound therein to perform a metallation. The method for producing the first metallocene compound will be specifically explained in the examples to be described below.

The compound represented by Chemical Formula 3 can be, for example, a compound represented by one of the following structural formulas, but is not limited thereto.

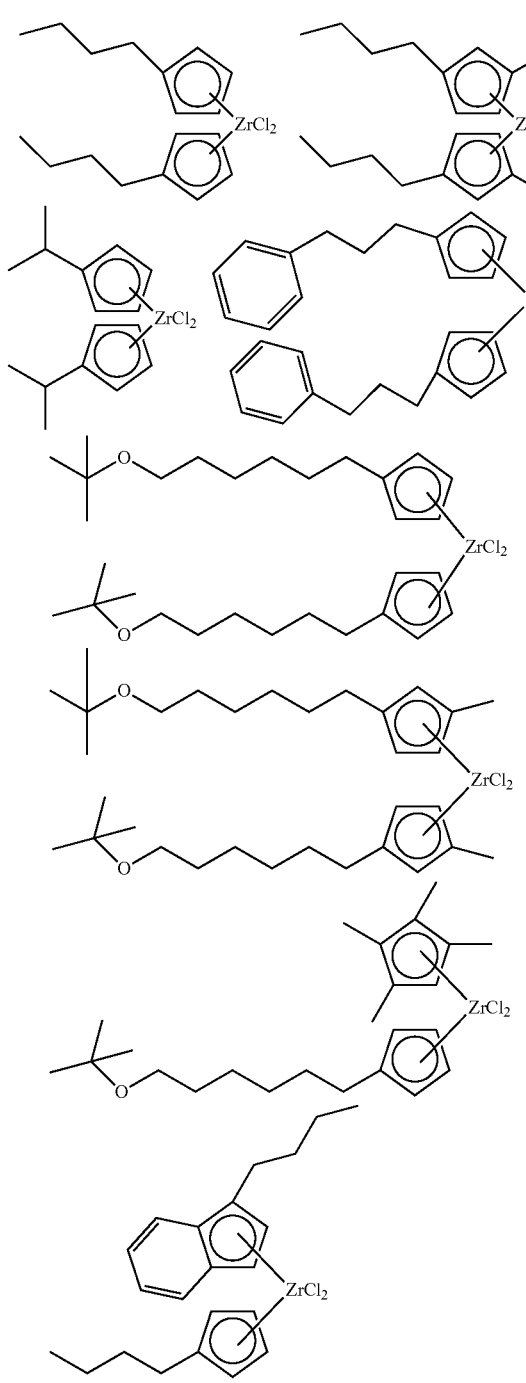

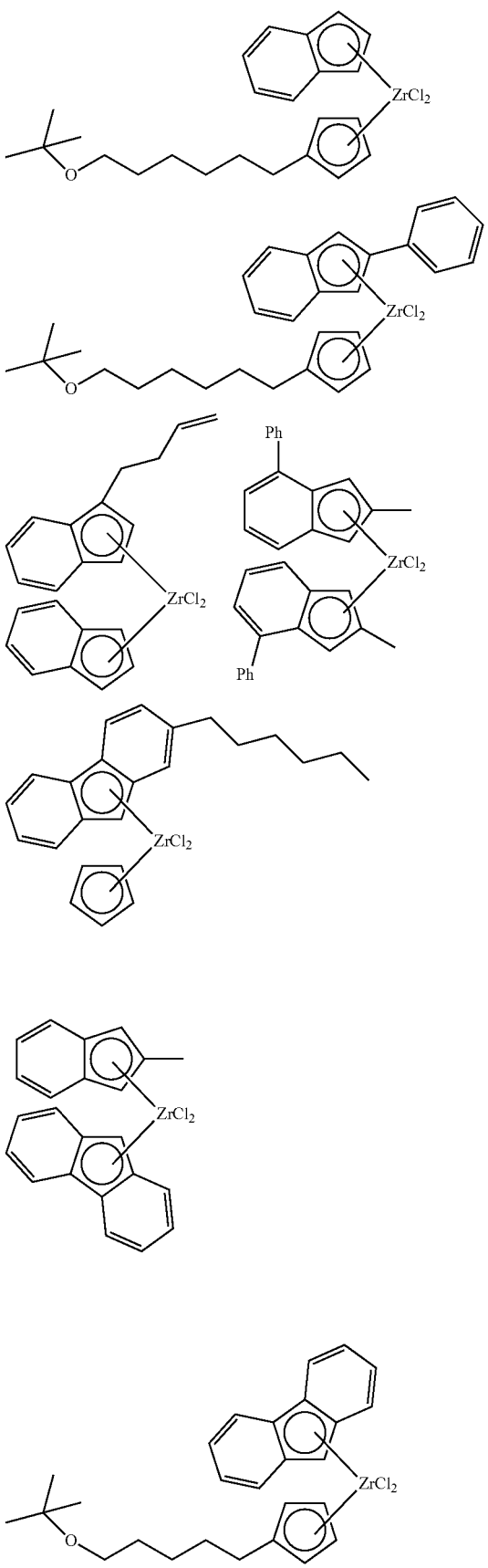

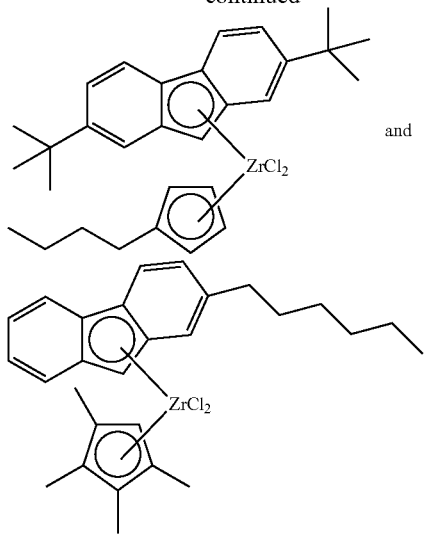
and
In Chemical Formula 4, when m is 1, it means a structure in which the Cp³Rᶜ ring, the Cp⁴Rᵈ ring or the Cp⁴Rᵈ ring and the M² are crosslinked via B¹, and when m is 0, it means a non-crosslinked compound structure.
The compound represented by Chemical Formula 4 may be, for example, a compound represented by one of the following structural formulas, but is not limited thereto.
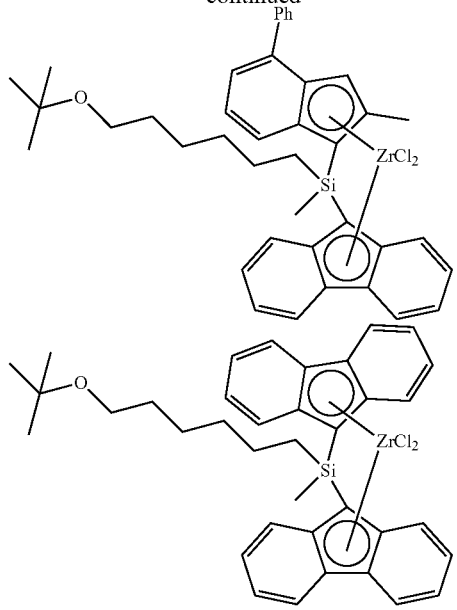
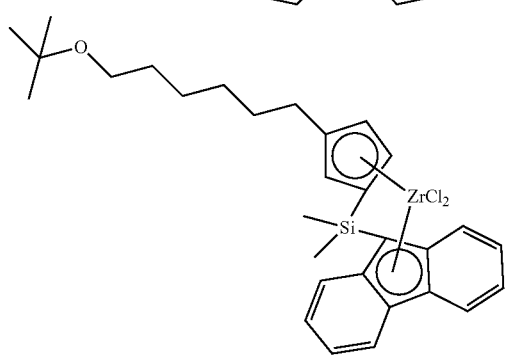
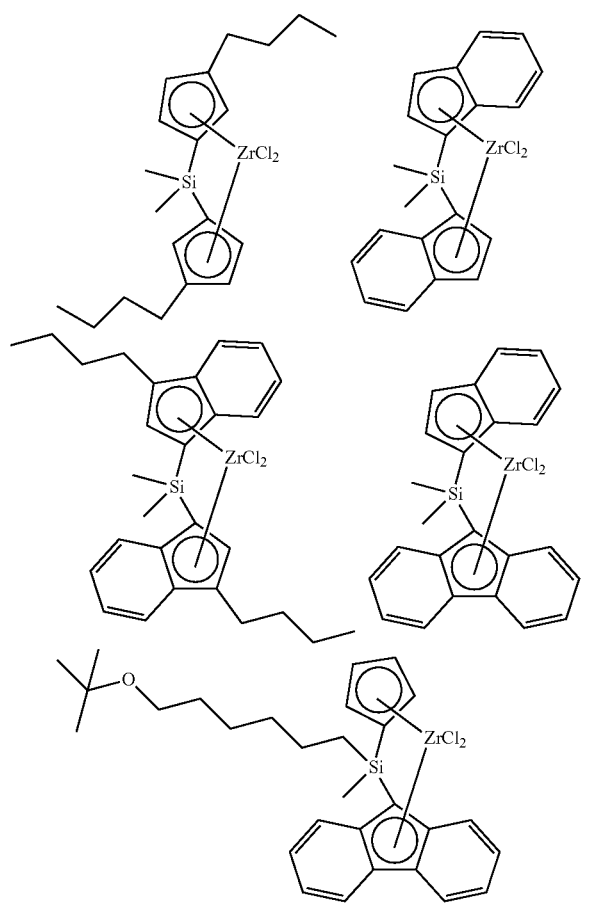

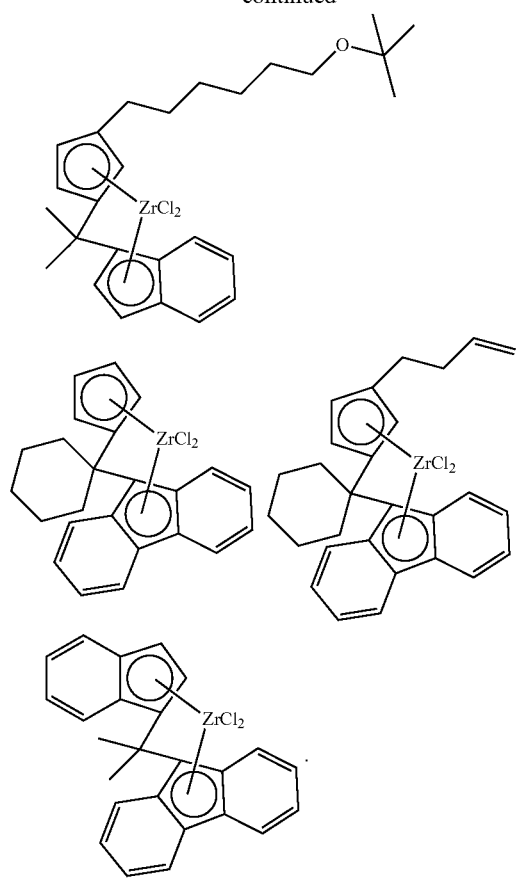
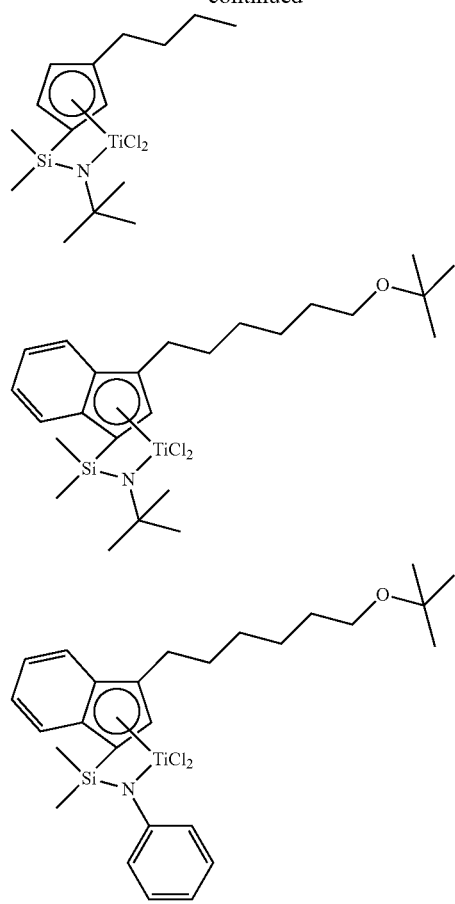
Further, the compound represented by Chemical Formula 5 may be, for example, a compound represented by the following structural formulas, but is not limited thereto.
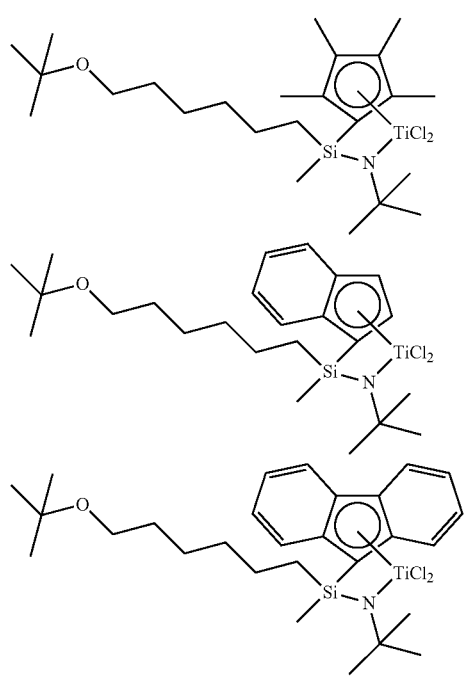
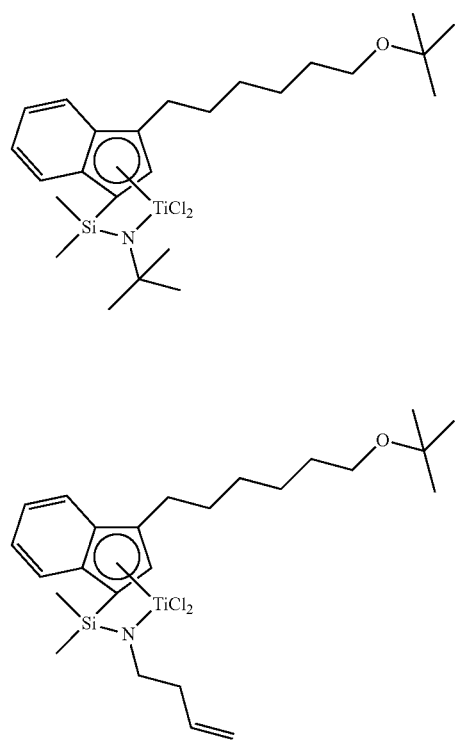

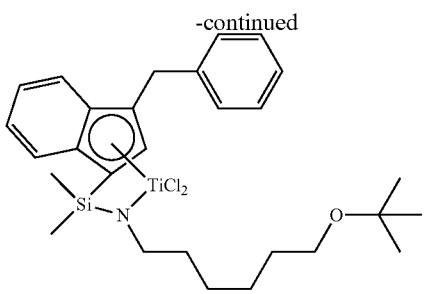

The metallocene catalyst used in the present invention may be a metallocene catalyst in which at least one of the first metallocene compounds represented by the Chemical Formula 1 and at least one of the second metallocene compounds selected among the compounds represented by the Chemical Formulas 3 to 5 are supported on a support together with a cocatalyst compound.

In addition, the supported metallocene catalyst can induce the generation of LCB (Long Chain Branch) in the ethylene/alpha-olefin copolymer to be produced.

In the supported metallocene catalyst according to the present invention, the cocatalyst to be supported on the support for activation of the metallocene compound is an organometallic compound containing a Group 13 metal, and it is not particularly limited as long as it can be used when polymerizing the olefin in the presence of a general metallocene catalyst.

Specifically, the cocatalyst compound may include at least one of an aluminum-containing primary cocatalyst of the following Chemical Formula 6 and a boron-containing secondary cocatalyst of the following Chemical Formula 7.

$$—[Al(R_{18})—O—]_k—$$ [Chemical Formula 6]

in Chemical Formula 6, $R_{18}$ is each independently a halogen, a halogen-substituted or unsubstituted hydrocarbyl group having 1 to 20 carbon atoms, and k is an integer of 2 or more, $$T^+[BG_4]^-$$ [Chemical Formula 7]

in Chemical Formula 7, $T^+$ is a +1 valent polyatomic ion, B is boron in an oxidation state of +3, and G is each independently selected from the group consisting of hydride, dialkylamido, halide, alkoxide, aryloxide, hydrocarbyl, halocarbyl and halo-substituted hydrocarbyl, wherein the G has 20 or less carbon atoms, provided that G is halide at one or less position.

By using the first and the second cocatalysts as above, the polyolefins finally prepared may have more uniform molecular weight distribution, while the polymerization activity can be enhanced.

The first cocatalyst of Chemical Formula 6 may be an alkylaluminoxane-based compound wherein the repeating units are combined into a linear, circular or network form. Specific examples of the first cocatalyst include methylaluminoxane (MAO), ethylaluminoxane, isobutylaluminoxane, butylaluminoxane, and the like.

Further, the second cocatalyst of Chemical Formula 7 may be a tri-substituted ammonium salt, or a dialkylammonium salt, or a tri-substituted phosphate type borate compound. Specific examples of the second cocatalyst include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl)ammonium tetraphenylborate, methytetradecyloctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentalluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl) borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate or N,N-dimethyl-(2,4,6-trimethylanilinium)tetrakis-(2,3,4,6-tetrafluorophenyl)borate and the like; a borate-based compound in the form of a dialkylammonium salt, such as dioctadecylammonium tetrakis(pentafluorophenyl)borate, ditetradecylammonium tetrakis(pentafluorophenyl) borate or dicyclohexylammonium tetrakis(pentafluorophenyl)borate; or a borate-based compound in the form of a trisubstituted phosphonium salt, such as triphenylphosphonium tetrakis(pentafluorophenyl)borate, methyldioctadecylphosphonium tetrakis(pentafluorophenyl)borate or tri(2,6-dimethylphenyl)phosphonium tetrakis(pentafluorophenyl)borate.

In the supported metallocene catalyst according to the present invention, the mass ratio between the whole transition metals contained in the first metallocene compound represented by the Chemical Formula 1 or the second metallocene compound represented by the Chemical Formulas 3 to 5 and the support may be 1:10 to 1:1000. When the support and the metallocene compound are contained in the range of the above mass ratio, an optimal shape can be provided. The mass ratio of the cocatalyst compound to the support may be 1:1 to 1:100.

In the supported metallocene catalyst according to the present invention, as the support, a support containing a hydroxy group on its surface can be used, and preferably a support having highly reactive hydroxy group and siloxane group, of which the surface is dried and removed of moisture can be used.

For example, silica, silica-alumina, silica-magnesia or the like, which are dried at high temperature, can be used, and they may typically contain oxides, carbonates, sulfates, and nitrates such as $Na_2O$, $K_2CO_3$, $BaSO_4$ and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

On the other hand, the ethylene/alpha-olefin copolymer according to the present invention can be produced by polymerizing ethylene and alpha-olefin in the presence of the supported metallocene catalyst described above.

The polymerization reaction may be carried out by copolymerizing ethylene and alpha-olefin, using a continuous slurry polymerization reactor, a loop slurry reactor, a gas phase reactor, or a solution reactor.

The polymerization temperature may be about 25 to about 500° C., preferably about 25 to about 200° C., and more preferably about 50 to about 150° C. Further, the polymerization pressure may be from about 1 to about 100 Kgf/cm², preferably from about 1 to about 50 Kgf/cm², more preferably from about 5 to about 30 Kgf/cm².

The supported metallocene catalyst can be injected after being dissolved or diluted in an aliphatic hydrocarbon solvent having 5 to 12 carbon atoms such as pentane, hexane, heptane, nonane, decane, and isomers thereof, an aromatic hydrocarbon solvent such as toluene and benzene, or a hydrocarbon solvent substituted with chlorine atom such as dichloromethane and chlorobenzene. It is preferable that the solvent is used after a small amount of water, air or the like acting as a catalyst poison is removed by treating with a small amount of aluminum. It may also be performed using an additional cocatalyst.

The ethylene/alpha-olefin copolymer according to the present invention can be produced by copolymerizing ethylene and alpha-olefin monomers, using a catalyst of Chemical Formulas 3 to 5 which mainly polymerizes low molecular weight polymer chains, and a catalyst of Chemical Formula 1 which mainly polymerizes high molecular weight polymer chains. Due to the interaction between these two or more catalysts, the low molecular weight and the molecular weight distribution generally increase.

As a result, the ethylene/alpha-olefin copolymer can exhibit excellent processability and is therefore suitable for producing products by an injection molding method.

Advantageous Effects

The ethylene/alpha-olefin copolymer according to the present invention has excellent processability and is therefore suitable for producing products by an injection molding method.

DETAILED DESCRIPTION OF THE EMBODIMENTS

Figure 1:
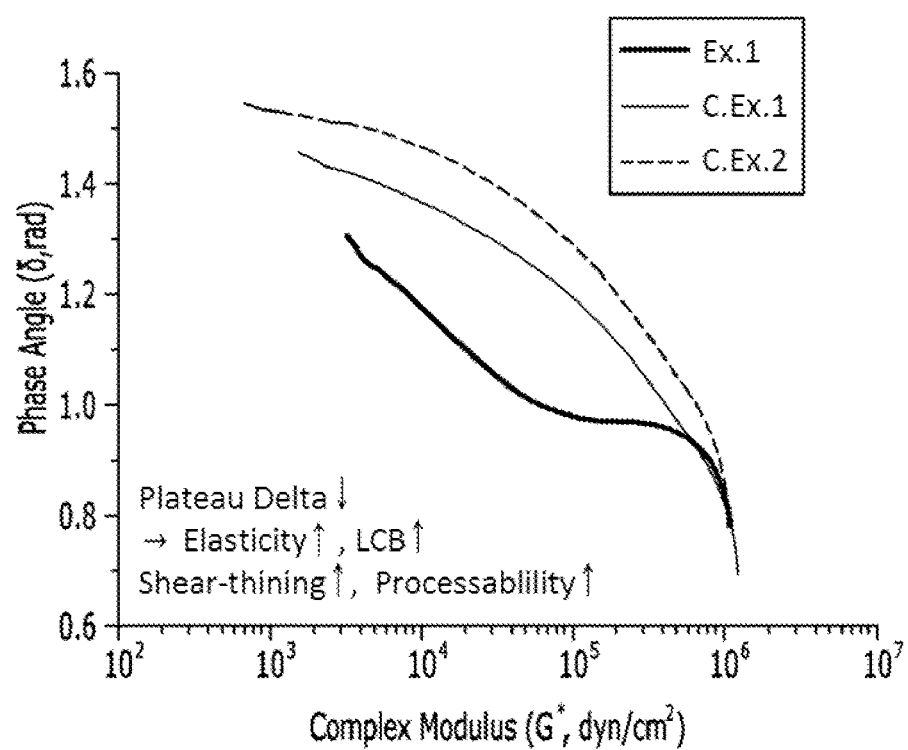
FIG. 1 shows vGP plots of the copolymers prepared in Example of the present invention and Comparative Examples.

Hereinafter, preferred Examples are provided for better understanding of the present invention. However, these Examples are for illustrative purposes only and the invention are not intended to be limited by these Examples.

First Metallocene Compound

Preparation Example 1

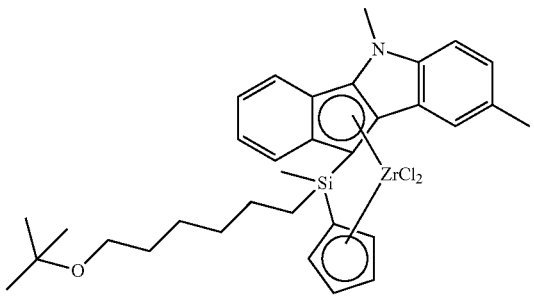

1-1) Preparation of a Ligand Compound 2 g of fluorene was dissolved in 5 mL of MTBE and 100 mL of hexane, and 5.5 mL of 2.5 M n-BuLi hexane solution was added dropwise in a dry ice/acetone bath and stirred overnight at room temperature. 3.6 g of (6-(tert-butoxy)hexyl)dichloro(methyl)silane was dissolved in 50 mL of hexane, and fluorene-Li slurry was transferred under a dry ice/acetone bath for 30 minutes and stirred overnight at room temperature. At the same time, 5,8-dimethyl-5,10-dihydroindeno[1,2-b] indole (12 mmol, 2.8 g) was dissolved in 60 mL of THF, and 5.5 mL of 2.5 M n-BuLi hexane solution was added dropwise in a dry ice/acetone bath and stirred overnight at room temperature. The reaction solution of fluorene and (6-(tert-butoxy)hexyl)dichloro(methyl)silane was subjected to NMR sampling to confirm the completion of the reaction, and then 5,8-dimethyl-5,10-dihydroindeno[1,2-b]indole-Li solution was transferred under dry ice/acetone bath. The mixture was stirred overnight at room temperature. After reaction, the reaction mixture was extracted with ether/water and the remaining moisture in the organic layer was removed with MgSO₄ to give the ligand compound (Mw 597.90, 12 mmol), and it could be confirmed by 1H-NMR that two isomers were produced.

¹H NMR (500 MHz, d₆-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m)

1-2) Preparation of Metallocene Compound 7.2 g (12 mmol) of the ligand compound synthesized in 1-1 above was dissolved in 50 mL of diethylether, and 11.5 mL of 2.5 M n-BuLi hexane solution was added dropwise in a dry ice/acetone bath and stirred overnight at room temperature. The mixture was dried under vacuum to give sticky oil having a brown color. This oil was dissolved in toluene to give a slurry. ZrCl₄(THF)₂ was prepared, and toluene (50 mL) was added thereto to prepare a slurry. The toluene slurry of ZrCl₄(THF)₂ (50 mL) was transferred in a dry ice/acetone bath. As the mixture was stirred overnight at room temperature, the color was changed to violet. The reaction solution was filtered to remove LiCl. The filtrate was dried under vacuum to remove toluene, hexane was added thereto, and the mixture was sonicated for 1 hour. The slurry was filtered to give 6 g of metallocene compound (Mw 758.02, 7.92 mmol, Yield 66 mol %) having a dark violet color as a filtered solid. Two isomers were observed through 1H-NMR.

$^1$H NMR (500 MHz, CDCl$_3$): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m)

Preparation Example 2

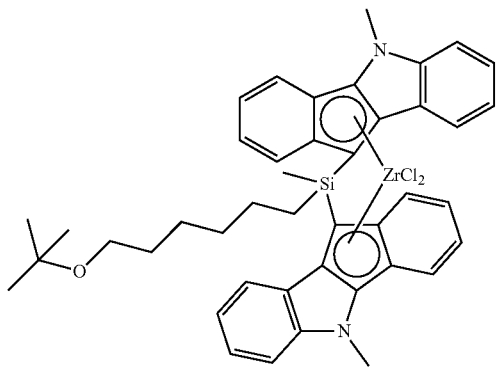

2-1) Preparation of a Ligand Compound

To a 250 mL flask was introduced 5-methyl-5,10-dihydroindeno[1,2-b]indole (2.63 g, 12 mmol), which was then dissolved in THF (50 mL). Then, 2.5 M n-BuLi hexane solution (6 mL) was added dropwise in a dry ice/acetone bath and stirred overnight at room temperature. In another 250 mL flask, (6-(tert-butoxy)hexyl)dichloro(methyl)silane (1.62 g, 6 mmol) was prepared by dissolving it in hexane (100 mL), which was then slowly added dropwise to a lithiated solution of 5-methyl-5,10-dihydroindeno[1,2-b]indole under a dry ice/acetone bath and stirred overnight at room temperature. After reaction, the reaction mixture was extracted with ether/water. The organic layer was treated with MgSO$_4$ to remove the remaining moisture and then dried under vacuum to give the ligand compound (3.82 g, 6 mmol) which was confirmed by 1H-NMR.

$^1$H NMR (500 MHz, CDCl$_3$): −0.33 (3H, m), 0.86~1.53 (10H, m), 1.16 (9H, d), 3.18 (2H, m), 4.07 (3H, d), 4.12 (3H, d), 4.17 (1H, d), 4.25 (1H, d), 6.95~7.92 (16H, m)

2-2) Preparation of Metallocene Compound

The ligand compound synthesized in 2-1 above (3.82 g, 6 mmol) was dissolved in toluene (100 mL) and MTBE (5 mL), and then 2.5 M n-BuLi hexane solution (5.6 mL, 14 mmol) was added dropwise in a dry ice/acetone bath and stirred overnight at room temperature. In another flask, ZrCl$_4$(THF)$_2$ (2.26 g, 6 mmol) was prepared as a slurry by adding toluene (100 mL). ZrCl$_4$(THF)$_2$ as a toluene slurry was transferred to the litiated ligand in a dry ice/acetone bath. The mixture was stirred overnight at room temperature and the color was changed to violet. The reaction solution was filtered to remove LiCl. The filtrate thus obtained was dried under vacuum, hexane was added thereto, and the mixture was sonicated. The slurry was filtered to give 3.40 g of metallocene compound (Yield 71.1 mol %) having a dark violet color as a filtered solid.

$^1$H NMR (500 MHz, CDCl$_3$): 1.74 (3H, d), 0.85~2.33 (10H, m), 1.29 (9H, d), 3.87 (3H, s), 3.92 (3H, s), 3.36 (2H, m), 6.48~8.10 (16H, m)

Second Metallocene Compound

Preparation Example 3: Preparation of [tBu-O—(CH$_2$)$_6$—C$_5$H$_4$]$_2$ZrCl$_2$]

t-Butyl-O—(CH$_2$)$_6$—Cl was prepared using 6-chlorohexanol according to the method described in Tetrahedron Lett. 2951 (1988), and then reacted with NaCp to obtain t-Butyl-O—(CH$_2$)$_6$—C$_5$H$_5$ (Yield 60%, b.p. 80° C./0.1 mmHg).

Also, t-Butyl-O—(CH$_2$)—C$_5$H$_5$ was dissolved in THF at −78° C., n-BuLi was slowly added thereto, and the mixture was warmed up to room temperature and then reacted for 8 hours. Again at a temperature of −78° C., thus prepared lithium salt solution was slowly added to a suspension solution of ZrCl$_4$(THF)$_2$ (1.70 g, 4.50 mmol)/THF (30 mL) and the mixture was further reacted at room temperature for 6 hours.

All volatile substances were dried under vacuum and hexane solvent was added to the resulting oily liquid substance, which was then filtered. The filtrate was dried under vacuum, and hexane was added to induce a precipitate at a low temperature (−20° C.). The resulting precipitate was filtered at a low temperature to give [tBu-O—(CH$_2$)$_6$—C$_5$H$_4$]$_2$ZrCl$_2$ compound (Yield 92%) as a white solid.

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7~1.3 (m, 8H), 1.17 (s, 9H)

$^{13}$C NMR (CDCl$_3$): 135.09, 116.66, 112.28, 72.42, 61.52, 30.66, 30.61, 30.14, 29.18, 27.58, 26.00

Preparation of Hybrid Supported Catalyst

Examples 1 and 2

3.0 kg of toluene solution was added to a 20 L sus autoclave, and the reactor temperature was maintained at 40° C. 500 g of silica (Grace Davison, SP2212) was added to the reactor and the silica was sufficiently dispersed. Then, 2.78 kg of 10 wt % methylaluminoxane (MAO)/toluene solution was added and the temperature was raised to 80° C. The mixture was stirred at 200 rpm for 15 hours or more. After the temperature of the reactor was lowered to 40° C., 7.5 wt % Catalyst Preparation Example 2/toluene solution (300 g) was added to the reactor and stirred at 200 rpm for 1 hour. 8.8 wt % Catalyst Preparation Example 1/toluene solution (250 g) was added to the reactor and stirred at 200 rpm for 1 hour. Catalyst Preparation Example 3 (20 g) was dissolved in toluene, charged into the reactor, and stirred at 200 rpm for 2 hours. 70 g of cocatalyst [anilinium tetrakis (pentafluorophenyl) borate] was diluted in toluene, charged into the reactor, and stirred at 200 rpm for 15 hours or longer. After the temperature of the reactor was lowered to room temperature, the stirring was stopped, and settling was then carried out for 30 minutes and the reaction solution was subjected to decantation. The toluene slurry was transferred to a filter dryer and filtered. 3.0 kg of toluene was added and stirred for 10 minutes, then the stirring was stopped and filtered. 3.0 kg of hexane was added to the reactor and stirred for 10 minutes, then the stirring was stopped and filtered. The filtrate was dried at 50 under reduced pressure for 4 hours to produce a 500 g-SiO$_2$-supported catalyst.

[Ethylene/1-Butene Copolymer]

Each of the hybrid supported metallocene catalysts prepared in Examples 1 and 2 was subjected to a bimodal operation using two hexane slurry stirred tank process polymerization devices to prepare an olefin polymer. As the comonomer, 1-butene was used.

The polymerization conditions using the hybrid supported metallocene catalysts in Examples 1 and 2 above are summarized in Table 1 below.

TABLE 1

| Used catalyst | Example 1 | Example 2 |
|---|---|---|
| R1 supply amount of ethylene (kg/hr) | 7.0 | 7.0 |
| R1 pressure (kg/cm$^2$) | 7.5 | 7.2 |
| R1 temperature (° C.) | 84.4 | 85.0 |
| R1 amount of charged hydrogen (g/hr) | 3.10 | 2.44 |
| R2 supply amount of ethylene (kg/hr) | 6.0 | 6.0 |
| R2 pressure (kg/cm$^2$) | 4.7 | 4.8 |
| R2 temperature (° C.) | 75.2 | 73.0 |
| R2 amount of charged 1-butene (g/hr) | 18.0 | 18.0 |
| Catalytic activity (kg PE/g SiO$_2$) | 6.1 | 7.8 |

Comparative Examples 1 to 2

In order to compare with the polymers prepared using the hybrid supported metallocene catalysts of Examples 1 and 2 above, the following copolymers having similar densities were used as comparative examples.
Comparative Example 1: KPIC M850
Comparative Example 2: LG ME8000
[Evaluation of Physical Properties of Copolymer]
The copolymers prepared in Examples and the copolymers prepared in Comparative Examples were evaluated for their physical properties by the following methods.
1) Density: ASTM 1505
2) Melt Flow Index (MFR, 5 kg/2.16 kg): Measuring temperature 190° C., ASTM 1238
3) MFRR (MFR$_5$/MFR$_{2-16}$): the ratio where MFR$_{10}$ melt index (MI, load: 5 kg) is divided by MFR$_{2-16}$ (MI, load: 2.16 kg).
4) Mn, Mw, MWD: The sample was melted and pretreated in 1,2,4-trichlorobenzene containing BHT 0.0125% using PL-SP260 at 160° C. for 10 hours, and the number average molecular weight and the weight average molecular weight were measured at a temperature of 160° C. using PL-GPC220. The molecular weight distribution was indicated by the ratio of the weight average molecular weight and the number average molecular weight.
5) Fitting with Graph of Complex Viscosity versus Frequency, Power Law and Cross Model: The complex viscosity was measured with ARES (Advanced Rheometric Expansion System) of TA instruments. Samples were made using a parallel plate with a diameter of 25.0 mm at 190° C. so as to have a gap of 2.0 mm. Measurement was carried out in a dynamic strain frequency sweep mode with a strain of 5%, a frequency of 0.05 rad/s to 500 rad/s, and a total of 41 points with 10 points at each decade. Power law fitting was carried out using TA Orchestrator which is a measurement program.
The above results are shown in Table 2, FIG. 1 and FIG. 2 below.

TABLE 2

| | Unit | Example 1 | Comparative Example 1 | Comparative Example 2 |
|---|---|---|---|---|
| Catalyst | — | Metallocene | Ziegler-Natta | Ziegler-Natta |
| Density | g/cm$^3$ | 0.961 | 0.965 | 0.958 |
| MI$_{2.16}$ | g/10 min | 5 | 4.7 | 8 |
| MFRR$_{5/2.16}$ | — | 3.9 | 3.2 | 2.9 |
| Weight Average Molecular weight | g/mol | 8.6 | 9.8 | 7.3 |
| Molecular weight distribution | — | 5.1 | 6.1 | 5.2 |
| Plateau Delta[1] | rad | 0.97 | — | — |
| —Sη* (—C$_2$) | — | 0.358 | 0.241 | 0.155 |

[1]Plateau Delta: Average value of the interval in which plateau is formed

Figure 2:
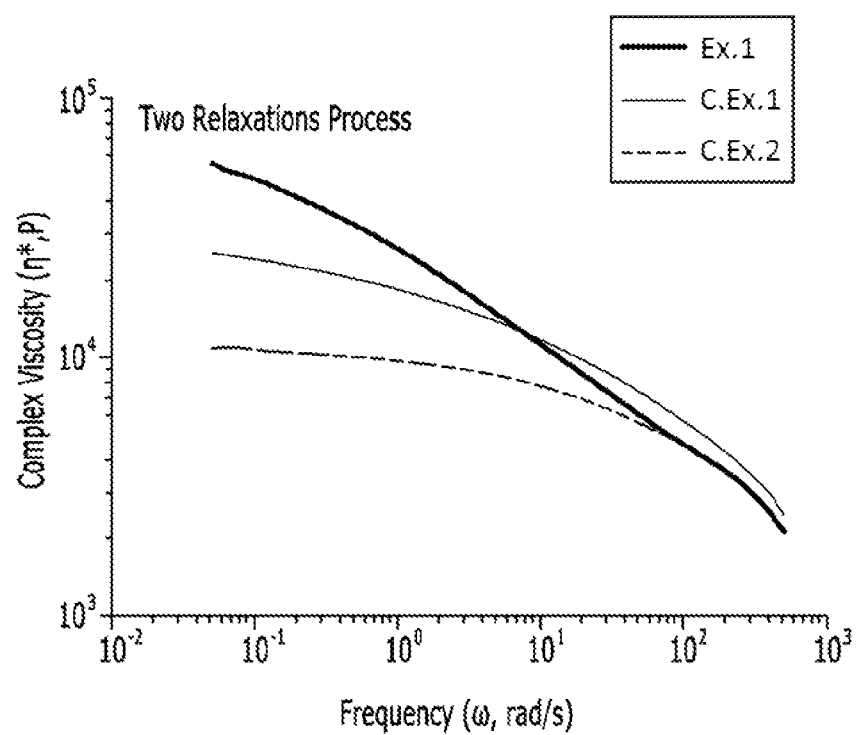
FIG. 2 shows a graph of the complex viscosity versus frequency in accordance with Example of the present invention and Comparative Examples.

As shown in Table 2 and FIG. 2 above, it could be confirmed that in the case of Example according to the present invention, the value of the negative gradient in the graph of complex viscosity versus frequency was higher as compared with Comparative Examples, and thus the shear thinning property was more excellent.

The invention claimed is:
1. An ethylene/1-butene copolymer having:
a weight average molecular weight of 50,000 to 150,000 g/mol,
a molecular weight distribution ($M_w/M_n$) of 5 to 10,
a density of 0.940 to 0.965 g/cm$^3$,
a melt flow rate ratio (MFR$_5$/MFR$_{2-16}$, measured at 190° C. according to ASTM 1238) of 3.5 or more,
a C$_2$ value of −0.25 or less when a graph of a complex viscosity (η*[Pa·s]) versus a frequency (ω [rad/s]) is fitted to a Power Law of Equation 1 below,

$$y=c_1 x^{c_2}, \quad \text{[Equation 1]}$$

wherein x is the frequency, y is the complex viscosity, C$_1$ is a consistency index, and C$_2$ is a CV index.
2. The ethylene/1-butene copolymer according to claim 1, wherein the weight average molecular weight is 80,000 to 90,000 g/mol.
3. The ethylene/1-butene copolymer according to claim 1, wherein the molecular weight distribution is 5 to 6.
4. The ethylene/1-butene copolymer according to claim 1, wherein the density is 0.960 to 0.965 g/cm$^3$.
5. The ethylene/1-butene copolymer according to claim 1, wherein the melt flow rate ratio is 3.5 to 40.
6. The ethylene/1-butene copolymer according to claim 1, wherein the C$_2$ value is −0.40 to −0.25.
7. The ethylene/1-butene copolymer according to claim 1, wherein
the ethylene/1-butene copolymer is produced by polymerizing ethylene and 1-butene in the presence of one or more of the first metallocene compounds represented by the following Chemical Formula 1; and one or more of the second metallocene compounds selected from the compounds represented by the following Chemical Formulas 3 to 5:

[Chemical Formula 1]

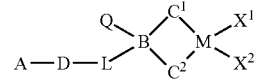

in Chemical Formula 1,
A is hydrogen, halogen, C$_{1-20}$ alkyl, C$_{2-20}$ alkenyl, C$_{6-20}$ aryl, C$_{7-20}$ alkylaryl, C$_{7-20}$ arylalkyl, C$_{1-20}$ alkoxy, C$_{2-20}$ alkoxyalkyl, C$_{3-20}$ heterocycloalkyl, or C$_{5-20}$ heteroaryl;

D is —O—, —S—, —N(R)— or —Si(R)(R')—, wherein R and R' are same as or different from each other, and are each independently hydrogen, halogen, $C_{1-20}$ alkyl, $C_{2-20}$ alkenyl, or $C_{6-20}$ aryl;

L is a linear or branched $C_{1-10}$ alkylene;

B is carbon, silicon or germanium;

Q is hydrogen, halogen, $C_{1-20}$ alkyl, $C_{2-20}$ alkenyl, $C_{6-20}$ aryl, $C_{7-20}$ alkylaryl, or $C_{7-20}$ arylalkyl;

M is a Group 4 transition metal;

$X^1$ and $X^2$ are same as or different from each other and are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$C^1$ and $C^2$ are same as or different from each other and each independently represented by one of the following Chemical Formulas 2a, 2b or 2c, provided that cases where both $C^1$ and $C^2$ are Chemical Formula 2c, are excluded;

[Chemical Formula 2a]

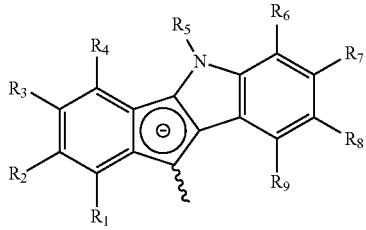

[Chemical Formula 2b]

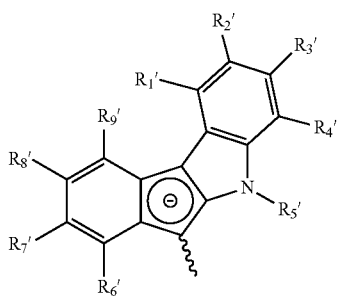

[Chemical Formula 2c]

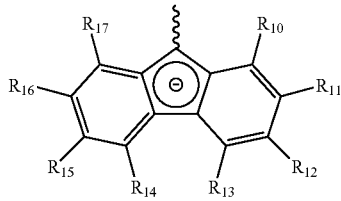

in Chemical Formulas 2a, 2b and 2c, $R_1$ to $R_{17}$ and $R_1'$ to $R_9'$ are same as or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-20}$ alkylaryl, or $C_{7-20}$ arylalkyl, and adjacent two or more of the $R_{10}$ to $R_{17}$ are connected to each other to form a substituted or unsubstituted aliphatic or aromatic ring;

$(Cp^1R^a)_n(Cp^2R^b)M^1Z^1_{3-n}$   [Chemical Formula 3]

in Chemical Formula 3, $M^1$ is a Group 4 transition metal;

$Cp^1$ and $Cp^2$ are same as or different from each other and are each independently any one selected from the group consisting of cyclopentadienyl, indenyl, 4,5,6,7-tetrahydro-1-indenyl, and fluorenyl radicals, which may be substituted with a hydrocarbon having 1 to 20 carbon atoms;

$R^a$ and $R^b$ are same as or different from each other and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z_1$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

n is 1 or 0;

$(Cp^3R^c)_mB^1(Cp^4R^d)M^2Z^2_{3-m}$   [Chemical Formula 4]

in Chemical Formula 4, $M^2$ is a Group 4 transition metal;

$Cp^3$ and $Cp^4$ are same as or different from each other and are each independently any one selected from the group consisting of cyclopentadienyl, indenyl, 4,5,6,7-tetrahydro-1-indenyl and fluorenyl radicals, which may be substituted with a hydrocarbon having 1 to 20 carbon atoms;

$R^c$ and $R^d$ are same as or different from each other and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^2$ is a halogen atom, $C_{1-20}$ alkyl, $C_{2-10}$ alkenyl, $C_{7-40}$ alkyl aryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^1$ is at least one of carbon, germanium, silicon, phosphorus, or nitrogen atom containing radicals, which cross-link $Cp^3R^c$ ring and $Cp^4R^d$ ring or which cross-link one $Cp^4R^d$ ring to $M^2$, a combination thereof;

M is 1 or 0;

$(Cp^5R^e)B^2(J)M^3Z^3_2$   [Chemical Formula 5]

in Chemical Formula 5, $M^3$ is a Group 4 transition metal;

$Cp^5$ is any one selected from the group consisting of cyclopentadienyl, indenyl, 4,5,6,7-tetrahydro-1-indenyl and fluorenyl radicals, which may be substituted with a hydrocarbon having 1 to 20 carbon atoms;

$R^e$ is hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^3$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^2$ is at least one of carbon, germanium, silicon, phosphorus, or nitrogen atom containing radicals, which cross-link $Cp^5R^e$ ring and J, or a combination thereof;

J is any one selected from the group consisting of $NR^f$, O, $PR^f$ and S, and the $R^f$ is $C_{1-20}$ alkyl, aryl, substituted alkyl or substituted aryl.

* * * * *